United States Patent [19]

Chiu

[11] Patent Number: 4,633,388
[45] Date of Patent: Dec. 30, 1986

[54] ON-CHIP MICROPROCESSOR INSTRUCTION DECODER HAVING HARDWARE FOR SELECTIVELY BYPASSING ON-CHIP CIRCUITRY USED TO DECIPHER ENCRYPTED INSTRUCTION CODES

[75] Inventor: Ming-Yee Chiu, Mt. Laurel, N.J.

[73] Assignee: Siemens Corporate Research & Support, Inc., Iselin, N.J.

[21] Appl. No.: 571,771

[22] Filed: Jan. 18, 1984

[51] Int. Cl.⁴ .................. G06F 12/14; G06F 5/00; H04L 9/00
[52] U.S. Cl. .................. 364/200; 178/22.08; 178/22.09
[58] Field of Search ............... 364/200, 900; 178/22.08, 22.09; 179/1.5 R; 358/114, 122

[56] References Cited

U.S. PATENT DOCUMENTS

| | | | |
|---|---|---|---|
| 3,368,207 | 2/1967 | Beausoleil et al. | 364/200 |
| 3,377,624 | 4/1968 | Nelson et al. | 364/200 |
| 4,120,030 | 10/1978 | Johnstone | 364/200 |
| 4,168,396 | 9/1979 | Best | 178/22 |
| 4,246,638 | 1/1981 | Thomas | 364/200 |
| 4,278,837 | 7/1981 | Best | 178/22.09 |
| 4,306,289 | 12/1981 | Lumley | 364/200 |
| 4,368,357 | 1/1983 | Gurak | 179/1.5 R |
| 4,433,207 | 2/1984 | Best | 178/22.09 |
| 4,465,901 | 8/1984 | Best | 178/22.08 |
| 4,471,163 | 9/1984 | Donald et al. | 178/22.08 |
| 4,513,174 | 4/1985 | Herman | 178/22.08 |
| 4,525,599 | 6/1985 | Curran et al. | 178/22.08 |
| 4,543,646 | 9/1985 | Ambrosius, III et al. | 364/900 |
| 4,555,591 | 11/1985 | Nash | 178/22.13 |
| 4,558,176 | 12/1985 | Arnold et al. | 178/22.08 |
| 4,562,305 | 12/1985 | Gaffney, Jr. | 178/22.08 |
| 4,591,660 | 5/1986 | Scordo | 178/22.05 |

OTHER PUBLICATIONS

T. Humphrey et al, *Two-chip Data-encryption Unit Supports Multi-key Systems*, Electronics, (vol. 53, No. 2, Jan. 1980), pp. 136–139.

Primary Examiner—Archie E. Williams, Jr.
Attorney, Agent, or Firm—John Francis Moran

[57] ABSTRACT

A microprocessor has on-chip hardware for protecting software against unauthorized use. The microprocessor includes a decoder for deciphering software instruction codes prior to their execution by the microprocessor. The instruction codes are enciphered in a unique way so that they can only be executed by the specific microprocessor for which they are intended.

6 Claims, 5 Drawing Figures

ON-CHIP MICROPROCESSOR INSTRUCTION DECODER HAVING HARDWARE FOR SELECTIVELY BYPASSING ON-CHIP CIRCUITRY USED TO DECIPHER ENCRYPTED INSTRUCTION CODES

BACKGROUND OF THE INVENTION

The present invention relates to microprocessor having on-chip hardware for protecting the software run on that microprocessor against unauthorized use on another microprocessor. More particularly, the present invention relates to a microprocessor which operates to execute instructions of only that software which is authorized for use on that microprocessor by the creator of the software.

Software "piracy" has been an unsolved problem for the creators of software, such as "software houses", since the advent of the microprocessor. Many techniques have been investigated and used to prevent software piracy; however, these techniques have proven either too complicated for normal commercial use or too easy to circumvent. One such technique, for example, is to use an encryption algorithm—e.g. from the Data Encryption Standard (DES) or Public Key Cryptography—which utilizes either a secret or a publicly available "key" to decode or decrypt the software. Such a technique requires a relatively large amount of computing power and time to unscramble the encrypted code. What has long been needed is a simple way to protect software which is extremely, if not totally, secure.

Another technique that has been suggested for protecting software is to put some protection into the read-only memories (ROMs) that hold the software code (i.e., the machine instructions). However, by using a modern logic analyzer with a microprocessor probe, it is relatively easy to monitor all of the instructions that go into a microprocessor and to disassemble the program. Although the instructions obtained in this way follow the program flow at run time, it is still possible to obtain all the software code. Another disadvantage of a ROM-based protection scheme is that it cannot provide protection for software on a floppy disc or other mass storage medium.

SUMMARY OF THE INVENTION

An object of the present invention is to provide a relatively simple technique for protecting software against piracy, where the software can be stored in a ROM, on a floppy disc or on any other storage medium.

This object, as well as other objects which will become apparent from the discussion that follows, are achieved, according to the present invention, by enciphering the machine codes defining each software instruction and providing, in the integrated circuit which forms the microprocessor, a decoder for deciphering the instruction codes prior to execution by the microprocessor.

The microprocessor according to the invention must therefore be made in a special way by the integrated circuit manufacturer. However, as will be pointed out below, the microprocessor according to the invention requires only some minor on-chip additions to the conventional microprocessor architecture.

The microprocessor according to the invention is preferably also constructed in a way which permits it to execute non-enciphered programs. The microprocessor according to the invention will thus remain 100% compatible with the microprocessor from which it is derived.

A microprocessor incorporating a decoder according to the present invention operates to decipher software which has been enciphered (encoded, scrambled) to protect it from unauthorized use. In order to ensure that encoded software may only be run on the microprocessor for which it is intended, the decoder in each microprocessor must be unique. This uniqueness may be achieved, according to a preferred embodiment of the invention, by manufacturing the microprocessor with a programmable decoder. In this way, either the integrated circuit manufacturer or the purchaser of the microprocessor may insert a unique deciphering key into the decoder so that only software which has been enciphered with this key may be decoded.

In practice, the integrated circuit manufacturer may only be responsible for incorporating the programmable decoder into the microprocessor chip. Thereafter, the OEM system builder may burn the deciphering key into the decoder of the microprocessor. From this point on, each microprocessor becomes unique so that the system builder must record the correspondence between the microprocessor serial number and the deciphering key.

The system builder may then develop software and encode it in a unique way for each system that it builds, using a different key for every system. The system builder can then sell its systems as well as its encoded software to users without disclosing to these users the keys associated with their particular systems.

According to another preferred embodiment of the invention, the decoder includes a device for deciphering instruction codes as well as a by-pass device, connected to the deciphering device, for directing *enciphered* instruction codes to the deciphering device and directing *non-enciphered* instruction codes around the deciphering device. Conveniently, the by-pass device includes a switch, arranged to receive instruction codes, for selecting the appropriate path for the instruction codes. This switch may, for example, be responsive to instruction codes received by the microprocessor for selecting either a decipher mode or a by-pass (non-decipher) mode. If a software house obtains a microprocessor system from an OEM system builder and develops software for its customers, the software house may run its own programs under the by-pass mode. After a program is fully debugged and converted to absolute code, the software house can offer this program for sale to its customers. When a sale is made, the software house must obtain the serial number of the microprocessor that the customer has and must then acquire the deciphering key for that microprocessor from the chip manufacturer or OEM system builder. The software house then enciphers (encodes, scrambles) the software according to the key and sells this software to its customer. The programs sold to each different customer are therefore each enciphered in a different way so that a given program will operate only on the microprocessor for which it is intended.

The foregoing and other objects, features and advantages of the invention will become apparent from the following, more particular description of the preferred embodiments of the invention as illustrated in the accompanying drawings.

DESCRIPTION OF THE PREFERRED EMBODIMENTS

Figure 1:
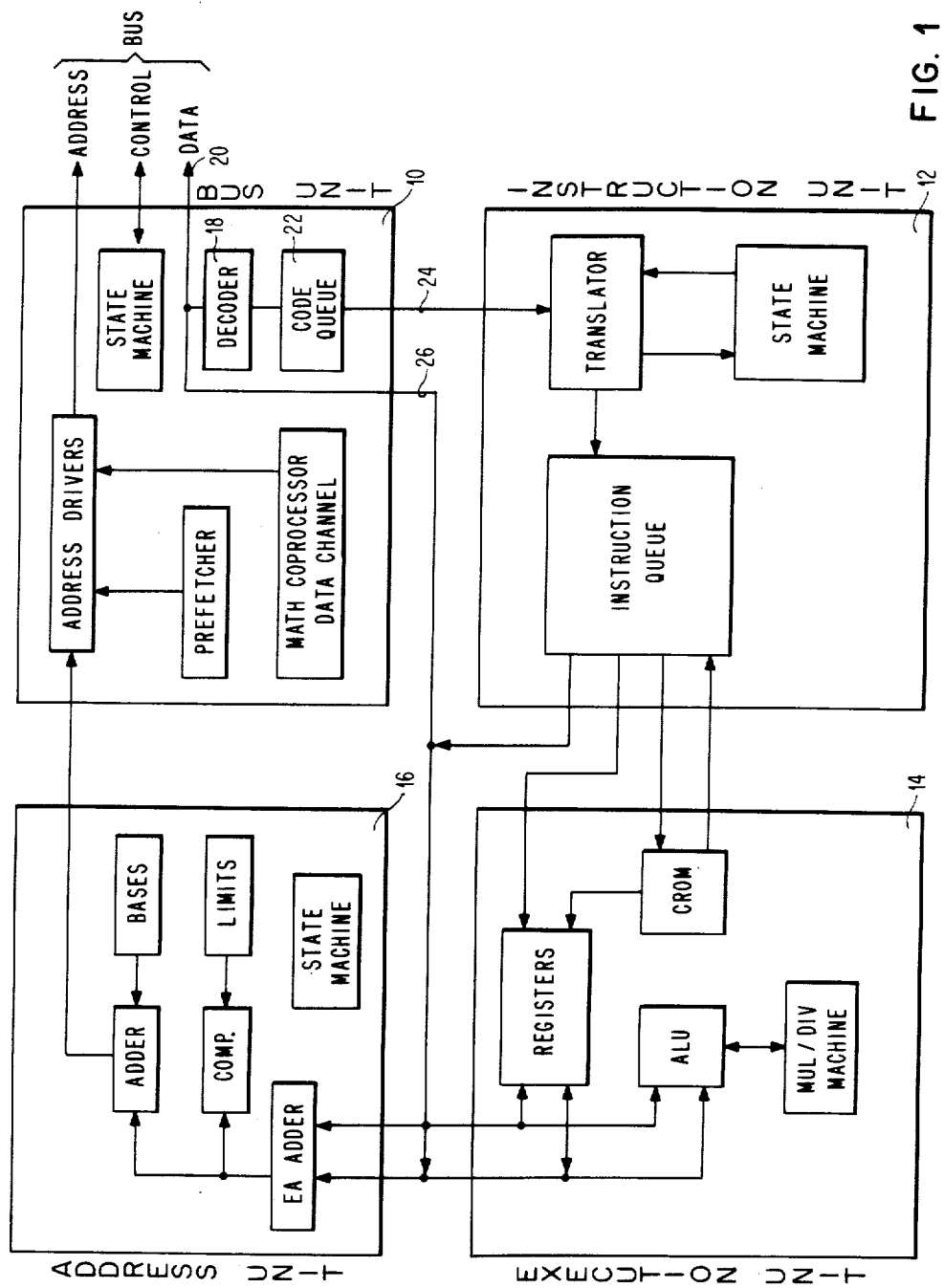
FIG. 1 is a block diagram of an Intel 80286 microprocessor which has been modified in accordance with one preferred embodiment of the present invention.

The preferred embodiments of the present invention will now be described with reference to FIGS. 1-5 of the drawings. Identical elements in the various figures are designated with the same reference numerals.

The Microprocessor: FIG. 1 illustrates, in block form, the internal architecture of an Intel 80286 microprocessor which has been modified, in accordance with the principles of the present invention, to provide protection for the software executed by this microprocessor. Although a specific, well-known microprocessor is shown in the figure, it will be understood that similar or like modifications may be made to any microprocessor in accordance with the invention for the purpose of software protection.

As shown in FIG. 1, the microprocessor comprises, clockwise from the upper right, a bus unit 10, an instruction unit 12, an execution unit 14 and an address unit 16. The structure and operation of these various units is conventional and well known with the exception of a modification to the bus unit 10. Attention is directed to the addition of a decoder circuit 18 arranged between the external data bus 20 and the code queue 22. The code queue operates to receive, store and apply successive instruction codes to the input lines 24 of the instruction unit 12. The instructions defined by these instruction codes are then executed by the instruction unit 12 in conjunction with the execution unit 14 and the address unit 16. According to the invention, the instructions are fetched from memory via the data bus 20 and passed through the decoder 18 to the code queue 22. This decoder is either constructed (hardware) or programmed (firmware) to decoder instruction codes which have been enciphered in a manner unique to this particular microprocessor.

According to a particular, preferred feature of the present invention the decoder circuit is "programmable"; that is, a decoding key or keys are programmed into the decoder 18 and used to decipher the instructions. As an example, the decoding key or keys can be stored in an EPROM which is integrated into the decoder. In this way, the microprocessor manufacture need only make one type of microprocessor which is later "customized" for each individual user.

After manufacturer of the microprocessor integrated circuit, the user of the microprocessor (or the OEM system builder) may program different keys into every microprocessor so that only particular, enciphered software can be executed on a particular microprocessor. In other words, after a key or keys have been programmed into the microprocessors, every microprocessor is unique. Thus, the enciphered software which is able to run on one microprocessor will not run on any other microprocessor of the same type which has a different key or keys in it.

In the microprocessor shown in FIG. 1, the data supplied to and generated by the microprocessor is applied to bus lines 26 within the microprocessor. These bus lines 26 are connected to the external data bus lines 20 via an I/O port. It should be noted that the decoder 18 functions to decipher only the instructions that are placed into the instruction queue. Thus, only the instructions are decoded; the data into or out of the microprocessor CPU is neither coded nor decoded.

As will be explained in detail below, the decoder 18 includes one or more "write only" registers which hold one or more keys for deciphering instruction codes. These keys can thus be stored (programmed) into these registers, but the keys cannot be read from these registers so that, once stored, the identity of the keys remains secure. The user of the microprocessor will therefore be unable to determine the deciphering key or keys.

Figure 2:
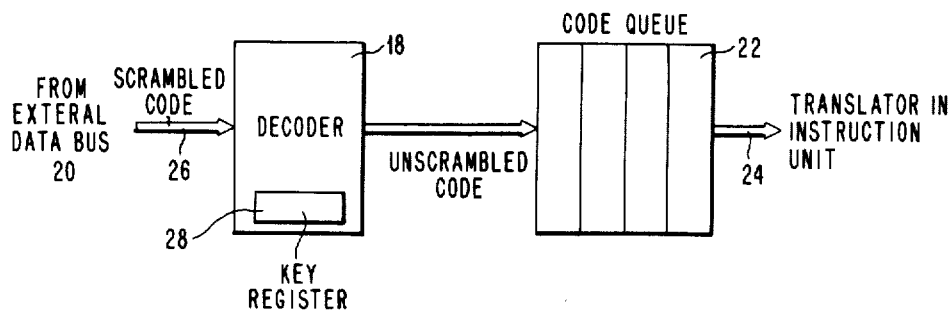
FIG. 2 is a block diagram of the decoder and code queue portion of the microprocessor in FIG. 1.

The Decoder: FIG. 2 illustrates the operation of the decoder according to the present invention. Enciphered or "scrambled" instruction codes are received from the external data bus 20 and applied to the decoder 18 via the internal bus 26. The decoder 18 deciphers or "unscrambles" each successive instruction code using the key stored in a "write only" key register 28. The unscrambled code is then passed to the code queue 22 which maintains a backlog of instruction codes in readiness for the translator in the instruction unit 12.

Figure 3:
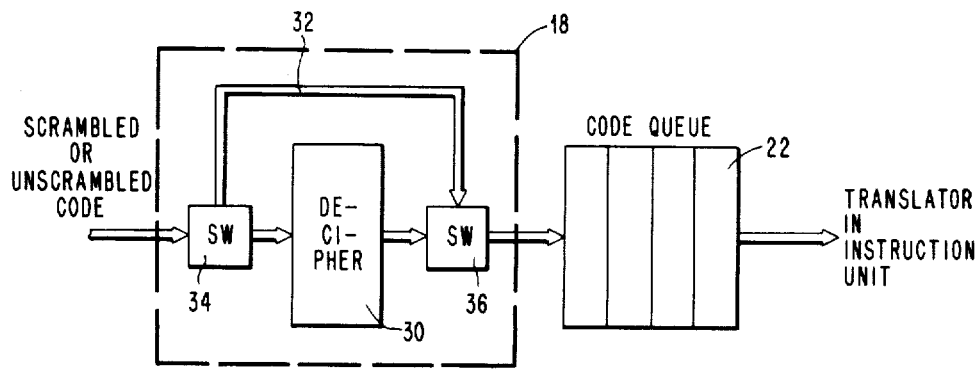
FIG. 3 is a block diagram of an alternative embodiment of a decoder and code queue according to the present invention.

FIG. 3 shows how the decoder 18 may be modified so that the microprocessor may handle normal, unscrambled instruction codes as well as the enciphered, scrambled codes as described above. The decoder 18 includes a deciphering unit 30 which translates scrambled code into unscrambled code; by-pass lines 32 as well as switches 34 and 36. The decoder 18 operates in one of two modes: in a "decipher mode" scrambled instruction codes are passed through the switch 34 to the deciphering unit 30 and unscrambled codes are passed from the deciphering unit 30 through the switch 36 to the code queue 22. In a "by-pass mode" unscrambled instruction codes received from the external data bus 20 are passed around the deciphering unit 30 via the switch 34, the by-pass lines 32 and the switch 36. In this by-pass mode the system exactly resembles a conventional microprocessor.

The deciphering unit 30 in the decoder 18 may be structured to operate in accordance with any known deciphering procedure. In general, the instruction codes must first be enciphered (scrambled), either by a hardware enciphering device or by computer processing using software. Mathematically, this may be written as follows:

$$(\text{cipher-code}) = E_k (\text{plain-code}),$$

where k=key.

There is a corresponding decoding process, denoted by $E_k^{-1}$, which converts the cipher code (scrambled code) back into the plain code (unscrambled code) in a one-to-one correspondence:

$$(\text{plain code}) = E_k^{-1} (\text{cipher code}).$$

The function of the deciphering unit 30 is to implement the $E_k^{-1}$ operation.

Figure 4:
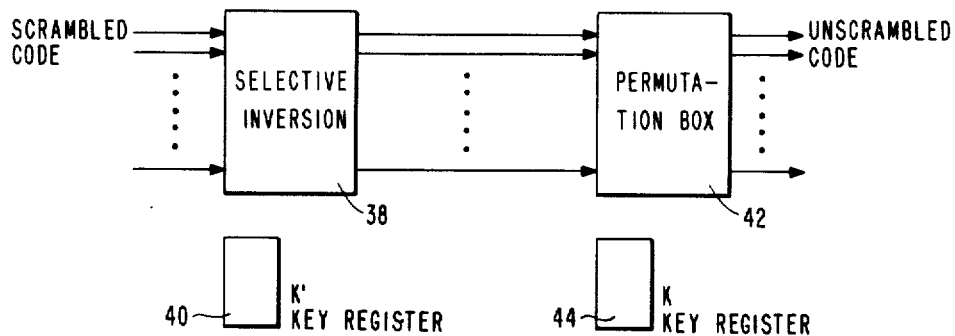
FIG. 4 is a block diagram of a specific decoder which may be used in the embodiments of FIG. 2 and FIG. 3.
Figure 5:
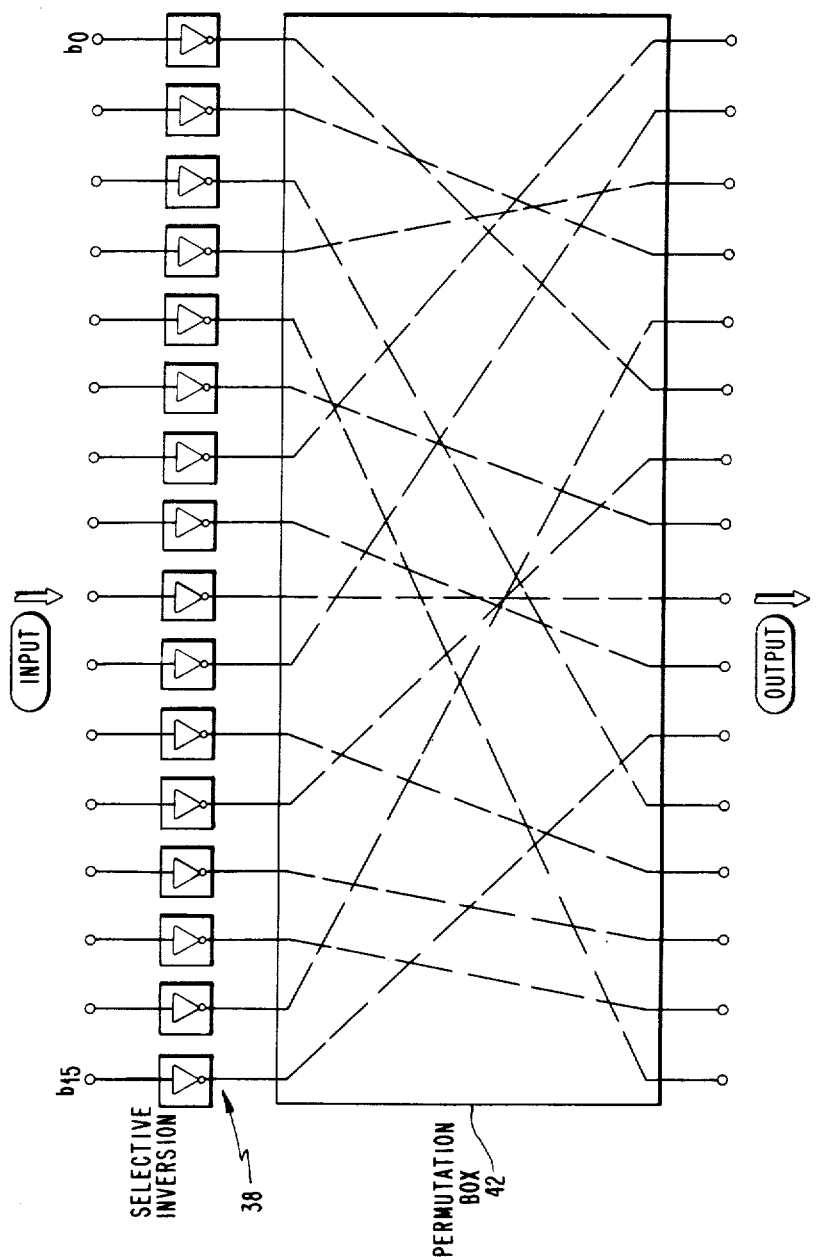
FIG. 5 is a schematic diagram of the decoder of FIG. 4.

FIGS. 4 and 5 illustrate a simple exemplary embodiment of such a deciphering unit.

As may be seen in FIG. 4, the deciphering unit comprises two separate stages: a selective inversion stage 38 having a first key register 40 for key k' and a permutation box 42 having a second key register 44 for a second key k. The selective inversion stage 38 and the permutation box 42 are shown in detail in FIG. 5 for a 16-bit instruction code.

The selective inversion stage inverts the $i^{th}$ bit $b_i$ if the $i^{th}$ bit of the first key k' is one: otherwise this stage just passes the instruction code bit through. In the specific example illustrated in FIG. 5, the first key k' is 1001000111111001.

The permutation box 42 operates to "permutate" the lines that come out of the selective inversion stage in accordance with the second key k. This permutation of lines is illustrated by the dashed lines within the box 42 of FIG. 5.

If the selective inversion and the permutation operation are denoted by $S_{k'}$ and $P_k$, respectively, then:

$$E_k^{-1} = P_k S_{k'}$$

The encoding process therefore is:

$$E_k = (E_k^{-1})^{-1} = (P_k S_{k'})^{-1} = S_{k'}^{-1} P_k^{-1}$$

However, $$S_{k'}^{-1} = S_{k'} \text{ and } P_k^{-1} = P_k.$$

Consequently, $$E_k = S_{k'} P_k$$

Therefore, to scramble the code, it is necessary merely to permutate the bits according to the second key k and then to perform the selective inversion using the first key k'. In the example shown in FIG. 5 with a 16-bit instruction code, the first key k' has 16 bits, whereas the second key k has 64 bits, giving a total of 80 bits. The total number of possible decoders using different keys is therefore:

$$2^{16} \times (16!) \approx 1.4 \times 10^{18}.$$

If the microprocessor is an 8-bit device with an 8-bit data bus, then only eight in/out lines are provided on the decoder. In this case, the first key k' requires only 8 bits while the second key k requires 32 bits giving a total of 40 bits. The total number of possible 8-bit decoders using different keys is therefore:

$$2^8 \times (8!) \approx 1 \times 10^7.$$

The Microprocessor Software: The microprocessor according to the present invention may have the key registers filled with the decoding keys by the manufacturer. However, it is also possible to program the keys (store the keys in the key registers) by means of special instructions. As noted above, the key registers can only be written to but not read from. The keys remain in the registers even if a reset instruction is executed by the microprocessor.

The microprocessor according to the invention also has a pair of instructions to set the decoder into either the decipher mode or the by-pass mode. Normally, when a reset is executed, the decoder is in the by-pass mode. The microprocessor starts executing bootstrap codes, and the codes that follow, in the by-pass mode. The bootstrap codes therefore must be unscrambled codes.

If, after execution of the bootstrap codes a piece of protected software comes along, the microprocessor follows the following rules:

(1) The first instruction of the protected software module will be a "set decipher mode" instruction, in an unscrambled code.

(2) The second instruction of the protected software module will be a "JMP" instruction which is also in an unscrambled code. The purpose of this instruction is to flush the code queue so that the codes which follow will have passed through the decoder.

(3) The scrambled codes of the protected software module immediately follow the JMP instruction.

(4) The last instruction of the protected software module is a "set by-pass mode" instruction. This instruction causes the microprocessor to return to its normal, by-pass mode.

The sequence of instructions for a protected software module embedded in unprotected software is illustrated below:

|    | SET DECIPHER MODE | UNSCRAMBLED CODE |
|----|-------------------|------------------|
|    | JMP A             |                  |
| A: | Program           | SCRAMBLED CODE   |
|    | SET BY-PASS MODE  |                  |
|    | Program           | UNSCRAMBLED CODE |

The number of bytes that make up the first two unscrambled code instructions must be less than the size of the code queue so that the flushing operation works properly.

There has thus been shown and described a novel microprocessor which fulfills all the objects and advantages sought therefor. Many changes, modifications, variations and other uses and applications of the subject invention will, however, become apparent to those skilled in the art after considering this specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. A microprocessor formed on an integrated circuit and adapted to execute the instructions of a specific instruction set, each instruction in said set being defined by a prescribed, digital instruction code, said microprocessor comprising, in combination:

(a) means, having a plurality of first inputs and responsive to said instruction codes applied to said first inputs, for executing the instructions defined by said instruction codes;

(b) instruction code queuing means, having a plurality of first outputs each connected to one of said first inputs of said instruction executing means, for receiving, storing and applying successive instruction codes to said first inputs, said queuing means including a decoder means for translating enciphered instruction codes into said prescribed, digital instruction codes; and said decoder means including (1) deciphering means for converting instruction codes; and (2) bypassing means, connected to said deciphering means, for directing enciphered instruction codes through said deciphering means and directing non-enciphered instruction codes around said deciphering means and said bypassing means including switching means, arranged to receive instruction codes, for selecting a path for said instruction codes either to said deciphering means or around said deciphering means; and said switching means is responsive to said instruction codes for selecting said path.

2. The microprocessor defined in claim 1, wherein said instruction code queing means has a plurality of second inputs and a buffer memory, coupled between said second inputs and said first outputs, for temporarily storing said instruction codes, said decoder means being connected in series with said buffer memory.

3. The microprocessor defined in claim 1, wherein said decoder means is programmable.

4. The microprocessor defined in claim 1, wherein said instruction codes received by said code queue are enciphered in a manner unique to said microprocessor.

5. The microprocessor defined in claim 1, wherein said switch means is responsive to specific ones of said instruction codes for selecting said path.

6. The microprocessor defined in claim 1, wherein said switch means is responsive to the presence or absence of enciphered instruction codes for selecting said path.

* * * * *